Patented July 6, 1954

2,683,139

UNITED STATES PATENT OFFICE 2,683,139

HYDROCARBON RESIN RECOVERY PROCESS

Robert F. Leary, Cranford, and Lester Marshall Welch, Madison, N. J., assignors to Standard Oil Development Company, a corporation of Delaware No Drawing. Application October 9, 1951, Serial No. 250,559

7 Claims. (Cl. 260—82)

This invention relates broadly to an improvement in the preparation of polymers prepared from olefinic reactants and, more particularly, relates to a novel method for the recovery of polymeric resins, in a pure state, substantially free of impurities.

It is known that a large and varied number of resins may be prepared by the Friedel-Crafts polymerization of mixtures of olefins such as diolefins in combination with monoolefins and/or aromatic compounds. For a number of uses, particularly the formation of a varnish, lacquer, enamel, or other surface coating by cooking the resin with linseed oil or other drying oils, it is important that the color of the resin and the final varnish containing the resin, be as light as possible. If the resin is isolated and recovered by simply stripping off the unreacted monomers and diluents, if any, the color is exceedingly dark. Heretofore, light colored, soluble resins have only been obtained by extensive and elaborate washing of the reactor solution to remove catalyst residues and associated impurities. It has been shown that water washing leaves a watery haze in the polymer which can only be removed by filtration. Even though the haze can be avoided by special washing techniques, traces of insoluble gel polymer generally make a filtration operation necessary in any event in order to remove solvent-insoluble gel from the finished resin. Usually it is necessary to wash the resin solution from the reactor 4 or 5 times, and in many cases up to 9 washes have been required to produce a satisfactory color. Such a process is not practical in a commercial operation.

On the other hand, the dark polymers which are obtained normally when polymerization catalysts of the Friedel-Crafts type are added to olefinic materials cannot be tolerated in the production of commercial resins. Although it is not known what is the precise cause for the color formation, it is believed that catalyst residues, particularly aluminum chloride which is widely used as a polymerization catalyst, play a major role in the formation of these color bodies. It has been generally found that the color problem is most acute when aluminum chloride, and, to a lesser extent, other aluminum halide salts are employed as the polymerization catalyst.

Resins can be prepared by a process in which olefinic materials hereinafter described are dissolved in a solvent which may also be a solvent for the resulting polymer. The mixture is adjusted to temperatures, generally below +60° C. and down to −164° C., and polymerized by the application to the olefin mixture of a Friedel-Crafts type catalyst.

The resins are, for the most part, soluble in hydrocarbon solvents. These polymers may be thermally or catalytically co-reacted with drying oils to form materials which are highly useful as bases for lacquer or paint films. These resins are also suitable for use in inks, rubber, floor tile, and molding compositions.

The raw materials for the resins are the multi-olefins, particularly butadiene and the substituted butadienes, both conjugated and non-conjugated, as well as the trienes and high unsaturates. The preferred multi-olefin is butadiene, but any of the multi-olefins having from 4 to about 15 carbon atoms per molecule are usable and more or less advantageous for the present invention. That is, while butadiene is the preferred material, dimethylbutadiene is almost as good, especially the 2,3-dimethyl butadiene-1,3. Other usable multi-olefins are isoprene, piperylene, the various ethyl butadienes, particularly the 1,4-diethyl butadiene-1,3; the propyl butadienes, particularly the 1,4-propyl butadiene-1,3 and also the triolefins such as myrcene and allo-ocimene. It is not necessary that the olefins be conjugated since the non-conjugated olefinic compounds are similarly usable. These include such compounds as dimethallyl, divinylbenzene, and the like.

It may be noted that there is a distinct difference in the character of the polymer obtained from the different olefins, some being superior for one purpose, some for another but all of the multi-olefins tested so far have been found to be satisfactory for one purpose or another and it is believed that all of the multi-olefins having from 4 to 15, inclusive, carbon atoms are efficient and usable for one purpose or another.

For the other raw material, any of the monoolefins having from 3 to 20 carbon atoms per molecule are useful. Particularly useful is the iso-octene, known as "dimer," particularly as produced by the doubling up of two molecules of isobutylene. Also useful are the iso-heptene and iso-hexene compounds. Other compounds which are useful and satisfactory for the polymerization are such compounds as propylene, the butenes, and the like. For most purposes, the iso-compounds of five to eight carbon atoms are somewhat more satisfactory since they copolymerize somewhat more readily, but where a hard polymer of high diolefin content and relatively low molecular weight, with good uniformity of molecular weight is desired, it is convenient to polymerize at a relatively high temperature in the presence of one of the less reactive comonomers such as the normal butenes or propylene, or diisobutylene, whereas if a relatively high molecular weight and relatively high content of monoolefin is desired to produce a compound of moderate iodine number, the less poisonous, more easily polymerizable substances such as isobutylene or isopentene or isohexene may be used.

Also useful as coreactants with the multiolefins are various aromatic compounds, which may replace part or all of the aliphatic monoolefins described above. These aromatic compounds may be benzene or substituted benzenes such as toluene or xylenes, the more highly alkylated benzenes with up to four alkyl substituents on the ring (e. g. durene) being particularly active and useful. Styrene and styrenes with alkyl groups substituted on the ring, such as p-methyl or p-ethyl styrene are also useful.

To make the resins, a mixture is prepared preferably containing the desired multi-olefin in a proportion greater than about 40% and the monoolefin in a minor proportion. Thus, a very useful resin may be prepared from a feed containing 40 to 75, preferably 60 to 65, parts of butadiene per 100 parts of monomer, with the balance being diisobutylene. Part or all of the monoolefin may be replaced with an aromatic compound such as benzene or toluene or durene to give a polymer of improved properties, particularly with respect to the chemical resistance of the film prepared by co-reacting the resin with a drying oil. The reaction mixture may contain only the polymerization reactant materials or it may contain the polymerizable reactant materials in the presence of a diluent or diluent-refrigerant.

Cracking processes which have recently been developed for converting petroleum feed stocks to low boiling fractions, also yield olefin-containing starting materials from which mixtures resins can be made. From these cracking processes, there are normally obtained distillates boiling in ranges of 100° F. to 450° F., which may contain considerable amounts of aromatic hydrocarbons admixed with substantial amounts of normally liquid unsaturated hydrocarbons which are capable of undergoing polymerization. These cracked gasoline distillates are treated with catalysts such as aluminum chloride to yield light-colored, soft plastic semi-solid to solid resins which can be used in surface coatings, floor tile, rubber, inks, etc.

The polymerization mixture of olefins is desirably held at a temperature ranging from $+60°$ C. to $-164°$ C., the preferred range being from about $+40°$ C. to about $-100°$ C. The cooling action necessary to remove the heat of reaction may be obtained by the use of a refrigerating jacket upon the storage tank and reactor, or by the use of an internal refrigerant. For some purposes, the temperature of $-78°$ C. as set by solid carbon dioxide either in a refrigerating jacket or as a direct addition as an internal refrigerant in the polymerization mixture is appropriate.

If a diluent or a diluent-refrigerant or internal refrigerant is used, it may consist of such substances as liquid ethylene or liquid ethane or on occasion even liquid methane, although the boiling temperature of liquid methane at $-164°$ C. is usually lower than desirable; or liquid propane or liquid butane or liquid ethyl chloride or methyl chloride, or the like may also be used. If a refrigerating jacket is used or an internal refrigerant, there may also be present a diluent in addition, which may be any of the saturated hydrocarbon liquids which boil above the temperature set by the refrigerant; or may be any of the mono- or poly-halogen-substituted hydrocarbons which are liquid at the reaction temperature, including such substances as ethyl or methyl chloride, ethylene dichloride, ethyl or methyl mono- or di-bromide, any of the hydrocarbons up to about 5 carbon atoms per molecule with any desired number of substituted halogen atoms being useful as long as the boiling point is above the polymerization temperature. The diluent or diluent refrigerant may be used in the proportion of from 0.5 part to 5 parts per 1 part of mixed polymerizable material. The reaction mixture is held at a temperature between $+60°$ C. and $-164°$ C., the choice of temperature being determined by the desired molecular weight and the ease of copolymerization of the mixture. In general, resins of low molecular weight which may be hard and brittle are obtained at the higher temperatures, while lower temperatures give a tougher material of higher molecular weight, with more elongation. Also, in general, resins made from a feed containing high proportions of diolefin are harder and more reactive than those from feeds of low diolefin content. When the desired temperature is reached the solution is polymerized by the application of a Friedel-Crafts type catalyst such as aluminum chloride preferably dissolved in a relatively low-freezing, inert solvent such as ethyl or methyl chloride or carbon disulfide.

Although the polymerization catalyst used in these reactions may be any of the well-known Friedel-Crafts catalysts, aluminum chloride is preferred for the preparation of these types of resins.

The catalyst solvent may be any non-complex forming, low-freezing substance which will dissolve 0.1% of the aluminum chloride catalyst or more. Ethyl and methyl chloride and carbon disulfide are particularly satisfactory with aluminum chloride. Any of the mono- or poly-halogen-substituted organic compounds up to 4 or 5 carbon atoms per molecule which have freezing points below 0° C. are useful. The essential requirements are that the catalyst solvent dissolve at least 0.1% of catalyst, that the solvent have a freezing point below 0° C., thereby being low-freezing, and that the catalyst solvent boil away easily from the catalyst, thereby being non-complex forming. The catalyst solution preferably has a concentration of from 0.1% to about 4% or 5% of the aluminum chloride catalyst, and is preferably added within the range of from 0.1 part to 0.5 part to the olefin solution. The amount of solvent, if used, is preferably sufficient to retain all of the polymer in the solution at the conclusion of the polymerization reaction.

Normally, the solution from the reactor is washed with water or a salt-containing water or a somewhat acidic or basic water solution, in order to remove the catalyst residues. As pointed out above, the amount of washing required to produce a satisfactory, light colored resin is very great and results in an uneconomical process. In this operation, the resin is recovered from the washed reactor solution by precipitation or by stripping off the unreacted monomers and other volatiles.

It has now been found that the washings can be avoided and resins of excellent color can be produced by adding small quantities of an agent which forms an essentially insoluble complex with the catalyst residues, followed by separating the solid complex from the resin solution as by filtering, and stripping to recover the resin. This process results in the removal of substantially all of the catalyst residues and produces a light colored, purified resin suitable for all practical, commercial uses. Although a number of compounds may be used as the precipitating agent, organic compounds show a wide range of usefulness. Methyl alcohol is much the preferred reagent to remove aluminum chloride catalyst. In general, about 2 moles of methyl alcohol is sufficient although from 4 to 6 moles of methyl alcohol per mole of AlCl$_3$ catalyst used is the optimum amount. In case a diluent is used in the polymerization in which the complex is wholly or even partially soluble, it is desirable to replace it by another solvent in which the complex is quite insoluble before filtering so that all of the complex may be removed as an insoluble material. The preferred solvent in which to conduct the filtration is a mainly paraffinic hydrocarbon such as a light petroleum naphtha fraction. The final stripping operation should be carried out in a non-oxidizing atmosphere for best results.

The polymers of the present invention show iodine numbers ranging from about 30 to about 275, although the preferred range is from about 65 to 200. Similarly, the polymers show Staudinger molecular weights ranging from 500 to 1000 up to about 100,000—the molecular weight being controlled in part by the variation in conditions under which the catalyst is prepared.

The invention will be more fully described by the following examples showing a number of specific embodiments although it is not intended to limit the inventtion thereto.

EXAMPLE I

A feed consisting of 250 g. of butadiene, 250 g. diisobutylene, and 500 g. methyl chloride was polymerized under reflux (−2° C.) with a solution of aluminum chloride in ethyl chloride as catalyst. A total of 9.5 g. AlCl$_3$ was added to reach 83% conversion of the monomers. Naphtha was added and the methyl chloride allowed to weather off. The resulting solution was split into a number of portions and small amounts of the compounds as indicated below were added to precipitate the catalyst residues. The solutions were then filtered with Superfiltrol clay as a filter aid and the solvent and unreacted monomers stripped off under vacuum. The color of the resin was evaluated on the Gardner color scale, on which "1" is water white and "18" is a dark reddish brown. The evaluations on the resins studied are shown in Table I below.

Table I

| Compound | Gardner Color of Final Resin |
| --- | --- |
| 1. Methyl alcohol | 2–3. |
| 2. Acetone | 8–9. |
| 3. Benzol methyl amine | 12. |
| 4. Allyl amine | 10–11. |
| 5. Ethyl ether | 7–8. |
| 6. Acetic acid | 7. |
| 7. Morpholine | 14. |
| 8. Glycerine | 13. |
| 9. Dioxane | 12. |
| 10. Isopropyl alcohol | 6. |
| 11. (control) | 18+. |

It is seen that methanol gave the best results. A Gardner color of 2–3, obtained with methyl alcohol, indicates almost a water white resin polymer while a color of 7 is light amber.

EXAMPLE II

A feed consisting of 300 g. butadiene, 200 g. of durene, and 500 g. of methyl chloride was polymerized to about 80% conversion with a solution of aluminum chloride in ethyl chloride. A total of 12.8 g. aluminum chloride was added. The reactor solution was treated as in Example I with the following results as shown in Table II.

Table II

| Compound | Gardner Color of Final Resin |
| --- | --- |
| 1. Methanol | 7. |
| 2. Ethyl ether | 7–8. |
| 3. Dioxane | 13–14. |
| 4. Acetic acid | 12–13. |
| 5. (control) | 18+. |
| 6. Glycerine | 13–14. |
| 7. Allyl amine | 9. |
| 8. Benzol methyl amine | 12–13. |
| 9. Acetone | 11–12. |
| 10. Morpholine | 7–8. |
| 11. Isopropyl alcohol | 12. |

Again, the methanol treated sample is the lightest in color. This type of resin, containing an aromatic compound, is characteristically darker in color than the butadiene-diisobutylene copolymer even when recovered using elaborate washing procedures.

EXAMPLE III

A feed consisting of 450 g. diisobutylene, 550 g. butadiene, and 1250 g. methyl chloride was polymerized under reflux at −4° C. to 81% conversion with 16 g. aluminum chloride added as a solution in ethyl chloride. 50 cc. methanol were added, naphtha was added, and the solution was weathered to remove methyl chloride. The solution was then filtered with Superfiltrol clay as a filter aid. A portion of the filtered solution was recovered by stripping of solvents and unreacted monomers under vacuum to yield a resin with a ring and ball softening point at 98° C. and a Gardner color of 2–3. This resin was cooked 4 hours at 565° F. with alkali-refined linseed oil. The material so obtained was diluted to 50% in Varsol to yield a varnish with a cure point of 22 seconds and a Gardner color of 9–10. This color is considered very good for small batches of varnish and is within the range considered acceptable for nearly all uses.

EXAMPLE IV

A feed consisting of 150 g. butadiene, 150 g. diisobutylene, and 150 g. isopentane was polymerized under reflux (about 20–25° C.) by the addition of 9 g. of aluminum chloride. The resulting polymer solution was split into 3 portions, to each of which was added 200 cc. of paraffinic naphtha to reduce the viscosity. To each portion was added the amount of methyl alcohol noted below, Superfiltrol clay was added, and the solution filtered. The solvent and unreacted monomers were stripped off under vacuum and the color of the resin evaluated on the Gardner scale. The data are shown in Table III below.

*Table III*

| Portion Number | Amount of Methyl Alcohol Added | | Filtration Rate | Color of Stripped Resin |
|---|---|---|---|---|
| | g | Mole MeOH/ AlCl₃ | | |
| 1 | 1.5 | 2.1 | slow | 9–10 (hazy). |
| 2 | 3 | 4.2 | fast | 6 (clear). |
| 3 | 9 | 12.6 | do | Do. |

It is shown that about 4.0 moles methanol/mole AlCl₃ are required for best and most economical results, but that a moderate excess, at least up to 12.6 moles MeOH/mole AlCl₃, is not harmful.

EXAMPLE V

Aluminum chloride catalyst was added to a series of olefin-containing steam cracked distillate fractions at about 80° F. with vigorous agitation. The time of the reaction is about 30 minutes and the amount of catalyst is 1.0 weight per cent based on the feed. At the end of the reaction the indicated amount of CH₃OH is added to form an aluminum chloride complex which is filtered from the resin solution. The resin solution is then stripped to a bottoms temperature of 270° C. at 3 to 5 mm. Hg. These experiments are summarized in Table IV.

*Table IV*

| Feed | Moles MeOH/ moles AlCl₃ | Percent Conversion to Resin | Resin Properties | | |
|---|---|---|---|---|---|
| | | | Softening Point, °C. | Gardner Color Index* | Percent AlCl₃ in Resin |
| Steam cracked distillate boiling below 135° C. at 10 mm. Hg | 8/1 | 15.9 | 94 | 9 | None |
| Steam cracked distillate (Boiling range 29° C. to 260° C.) | 8/1 | 18.6 | 110 | 9 | 0.05 |
| Steam cracked distillate (Boiling range 29° C. to 130° C.) | 8/1 | 24.8 | 92 | 1 | .02 |

*Color 1 very light; color 9 amber.

These data show that methyl alcohol can be successfully employed to remove AlCl₃ catalyst from polymers prepared from olefin mixtures derived from cracked petroleum distillates.

What is claimed is:

1. A process for recovering a light-colored resin from a reaction mixture prepared by the polymerization of a diolefin-monoolefin mixture with aluminum chloride, which consists in adding to said mixture an essentially paraffinic hydrocarbon solvent, thereafter adding from two to six moles of methyl alcohol per mole of aluminum chloride to precipitate the aluminum chloride as an insoluble complex, separating the insoluble complex by filtration, and thereafter recovering the resin from the naphtha solution.

2. A process according to that described in claim 1 in which the resin is prepared from a butadiene-diisobutylene mixture.

3. A process according to that described in claim 1 in which the resin is prepared from an olefin-containing steam cracked distillate fraction.

4. A process for recovering a light-colored resin from a reaction mixture prepared by the polymerization of a diolefin-aromatic mixture with aluminum chloride, which consists in adding to said mixture hydrocarbon naphtha solvent, thereafter adding from two to six moles of methyl alcohol per mole of aluminum chloride to precipitate the aluminum chloride as an insoluble complex, separating the insoluble complex by filtration, and thereafter recovering the resin from the naphtha solution.

5. A process according to that described in claim 4 in which the resin is prepared from a butadiene-durene mixture.

6. A process for recovering a light-colored resin from a reaction mixture prepared by the polymerization of a diolefin-monoolefin mixture with aluminum chloride catalyst dissolved in an alkyl halide solvent, which consists in removing substantially all of the alkyl halide from the mixture, adding to said mixture hydrocarbon naphtha solvent, thereafter adding four moles of methyl alcohol per mole of aluminum chloride to form an insoluble aluminum chloride complex, separating the insoluble complex from the mixture, and thereafter recovering the resin from the naphtha solution.

7. In a process for preparing a light-colored hydrocarbon resin, suitable for use as a surface coating material, by the polymerization of a diolefin-monoolefin mixture with an aluminum chloride catalyst dissolved in an alkyl halide solvent, the improvement which consists of the steps of removing substantially all of the alkyl halide solvent, adding an essentially paraffinic hydrocarbon solvent to the reaction mixture, thereafter adding two moles of methyl alcohol per mole of aluminum chloride to form an insoluble aluminum chloride complex, separating said insoluble complex from the resin solution, and thereafter recovering the resin from the remaining solution.

References Cited in the file of this patent

UNITED STATES PATENTS

| Number | Name | Date |
|---|---|---|
| 2,062,845 | Thomas | Dec. 1, 1936 |
| 2,476,000 | Sparks | July 12, 1949 |